United States Patent
Ljunggren

(10) Patent No.: US 8,323,366 B2
(45) Date of Patent: Dec. 4, 2012

(54) PROCESS AND EQUIPMENT FOR PRODUCING SYNTHESIS GAS FROM BIOMASS

(75) Inventor: Rolf Ljunggren, Sollentuna (SE)

(73) Assignee: Cortus AB, Sollentuna (SE)

( * ) Notice: Subject to any disclaimer, the term of this patent is extended or adjusted under 35 U.S.C. 154(b) by 626 days.

(21) Appl. No.: 12/519,210

(22) PCT Filed: Dec. 11, 2007

(86) PCT No.: PCT/SE2007/001096
§ 371 (c)(1),
(2), (4) Date: Jun. 15, 2009

(87) PCT Pub. No.: WO2008/073021
PCT Pub. Date: Jun. 19, 2008

(65) Prior Publication Data
US 2010/0043291 A1    Feb. 25, 2010

(30) Foreign Application Priority Data

Dec. 14, 2006 (SE) ........................ 0602488

(51) Int. Cl.
*C01B 3/36* (2006.01)
*C01B 6/24* (2006.01)
*B01J 7/00* (2006.01)
*B01D 53/22* (2006.01)
*B01D 53/02* (2006.01)

(52) U.S. Cl. ................ 48/197 R; 48/61; 95/47; 95/130; 423/644

(58) Field of Classification Search ................ 48/197 R; 95/47, 130
See application file for complete search history.

(56) References Cited

U.S. PATENT DOCUMENTS 3,031,287 A * 4/1962 Benson et al. .............. 48/197 R
4,497,637 A   2/1985 Purdy et al.

FOREIGN PATENT DOCUMENTS

| CA | 2 569 009 | 12/2005 |
|---|---|---|
| DE | 197 20 331 | 11/1998 |
| JP | 4-96995 | 3/1992 |
| WO | 2004/072207 | 8/2004 |

OTHER PUBLICATIONS

International Search Report dated Mar. 26, 2008, from corresponding PCT application.

* cited by examiner

*Primary Examiner* — Matthew Merkling
(74) *Attorney, Agent, or Firm* — Young & Thompson

(57) ABSTRACT

A process for producing synthesis gas (S) from biomass, includes drying the biomass and gasifying the biomass. An equipment to carry out the process is also disclosed. The process further includes: subjecting the outgoing gases ($CO_2$, $N_2$ and $H_2O$) from the gasifying step to a first heat exchange, where the outgoing gases ($CO_2$, $N_2$ and $H_2O$) are cooled, purifying the outgoing gases ($CO_2$, $N_2$ and $H_2O$) to achieve a process gas (P), the purification being effected by eliminating nitrogen ($N_2$) from the outgoing gases ($CO_2$, $N_2$ and $H_2O$), subjecting the process gas (P) to heat exchange, where the process gas (P) is heated, reducing the process gas (P) to synthesis gas (S), subjecting the synthesis gas (S) to heat exchange, where the synthesis gas (S) is cooled and supply air to the gasification is heated.

18 Claims, 3 Drawing Sheets

PROCESS AND EQUIPMENT FOR PRODUCING SYNTHESIS GAS FROM BIOMASS

TECHNICAL FIELD OF THE INVENTION

The present invention relates to a process for producing synthesis gas from biomass, said process comprising the steps of drying the biomass and gasifying the biomass. The present invention also relates to an equipment to carry out the process according to the present invention.

This new process for gasification of biomass based upon gas generators, gas purification and regenerative heating will be more efficient than any known solution and possible to use from a medium scale (community) to a large (industry).

PRIOR ART

Biomass gasification is an important source of "green" energy. This is mainly due to its capability to be both renewal and adding no carbon dioxide to the atmosphere. It is also the source of synthesis gases for the second generation of liquid bio fuel production.

To find the most efficient process for gasification of biomass (wood) is an ongoing business all over the world. Most initiatives to gasification comes from boilers where steam and electricity is provided in parallel to gasification. This process is focused on heat generation and recycling without steam formation.

From JP 4096995 it is previously known a process for production of high-energy gas, said production starting from a mixture of coke oven gas and converter gas. Oxygen gas is added to the mixture. In a subsequent phase methane gas is produced. In a final phase of the production of the high-energy gas the present nitrogen gas is removed by cryogenic separation.

OBJECTS AND FEATURES OF THE INVENTION

The primary object of the present invention is to present a process for producing a synthesis gas having a high heat value.

A further object of the present invention is to eliminate nitrogen from the combusting gases.

A still further object of the present invention is to reduce the purified gas, i.e. the gas from which nitrogen has been removed.

An even still further object of the present invention is to perform a number of heat exchanging steps during the process.

At least the primary object of the present invention is realised by a process that has been given the characterising features of the appending independent claim 1. Preferred embodiments of the invention are defined in the dependent claims.

BRIEF DESCRIPTION OF THE DRAWINGS

A preferred embodiment of the invention will be described below, reference being made to the accompanying drawings, where.

DETAILED DESCRIPTION OF A PREFERRED EMBODIMENT OF THE INVENTION

Figure 1:
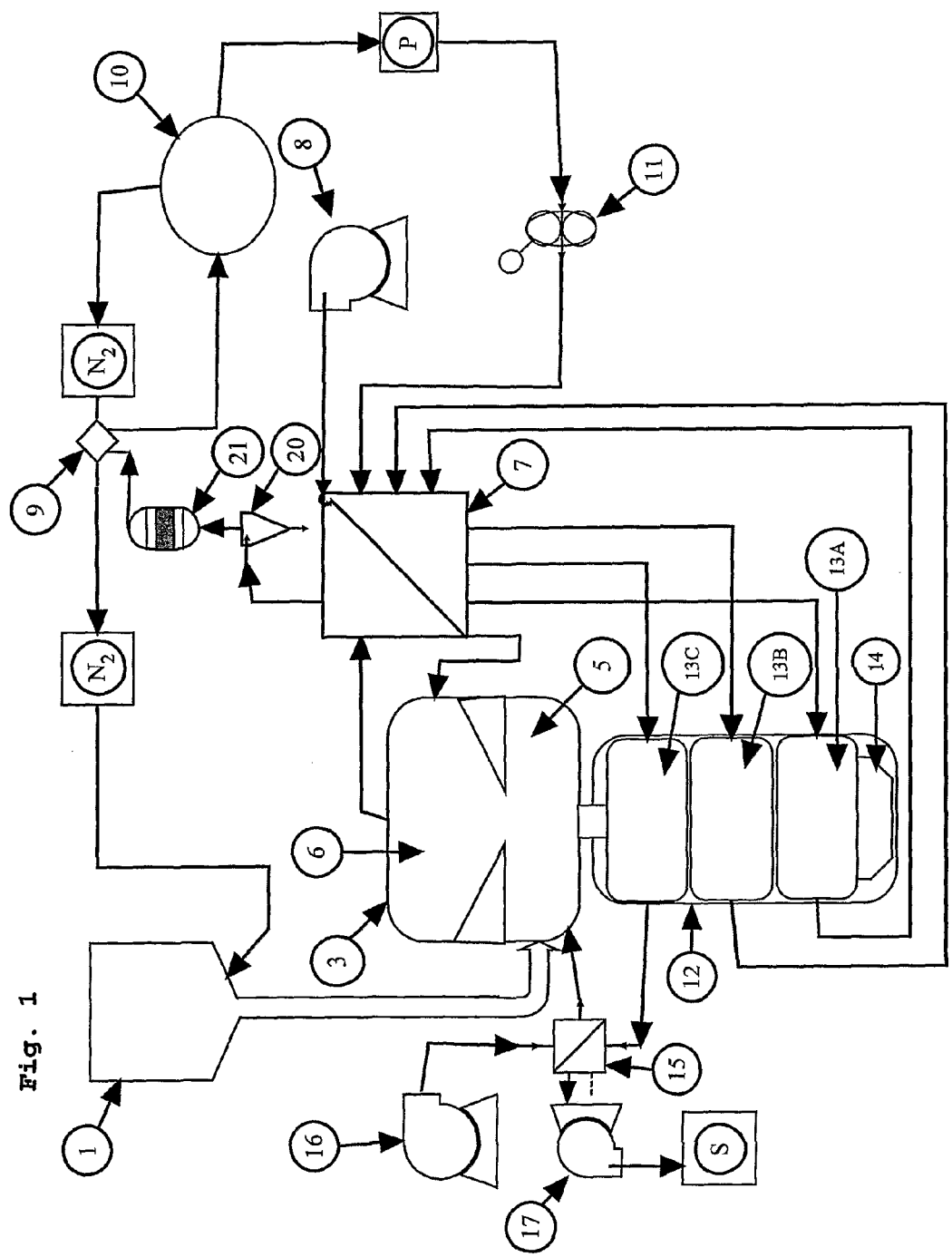
FIG. 1 shows a flow diagram of a preferred process according to the present invention, said diagram also schematically showing units that form an equipment to carry out the process.

In FIG. 1 a number of units that form the equipment to carry out the process are schematically shown. The conduits, pipes etc. that connect the units of the equipment are not described or shown in detail. The conduits, pipes etc. are of suitable design to carry out their function, i.e. to transport gases and solids between the units of the equipment.

The equipment comprises a supply storage unit 1 for the biomass. Biomass is usually either wood or crops that are specially grown and harvested for this purpose or by-products from pulp and paper or other industries. The supply storage unit 1 is designed to allow a stream of heated nitrogen to pass through the storage unit to dry the biomass. Biomass has some drawbacks as fuel because it is harvested with quite a high level of water (humidity) which lowers its heating value and calls for drying before using it. Many of the by-products are pelletized to be easier to handle (before and after drying). There is also a possibility to coke the wood and have a more pure source of energy.

The equipment also comprises a reactor unit 3 that in its turn comprises a pyrolysis chamber 5 and a combustion chamber 6, both said chambers normally being equipped with a ceramic lining. The equipment also comprises a first regenerator assembly 7 that is connected to the combustion chamber 6 of the reactor unit 3. The purpose of the first regenerator assembly 7 is to effect heat exchange at extremely high temperatures, i.e. in the magnitude of 1500-1600° C. Normally a regenerator comprises ceramic material. The first regenerator assembly 7 is also connected to a first heat exchanger 9 that is included in the equipment of the present invention. The first regenerator assembly 7 and the first heat exchanger 9 together form a first heat exchanging means. The first heat exchanger 9 is connected to a gas purification unit 10 that also forms a part of the equipment according to the present invention. The gas purification unit 10 will be described more in detail below.

A first air fan 8 is connected to the first regenerator assembly 7, said first air fan 8 forming a part of the equipment according to the present invention. The first regenerator assembly 7 is also connected to the combustion chamber 6 to allow air from the first air fan 8 to be supplied to the combustion chamber 6.

Between the gas purification unit 10 and the first regenerator assembly 7 a rotary blower 11 is provided, said rotary blower 11 being a part of the equipment according to the present invention. Thus, the gas purification unit 10 is connected to the rotary blower 11 and the rotary blower 11 in its turn is connected to the first regenerator assembly 7.

The equipment according to the present invention also comprises a reduction shaft 12 that is connected to the pyrolysis chamber 5 of the reactor unit 3. The reduction shaft 12 is divided into a number of compartments 13A-13C, each compartment 13A-13C carrying out a reduction step. A ceramic valve (not shown) will control the transport of coke fuel from the pyrolysis chamber 5 to the reduction shaft 12. At the bottom of the reduction shaft 12 there is a slag pocket 14, in which the remaining ash and slag is collected.

Adjacent to the reactor unit 3 and the reduction shaft 12 there is a second heat exchanging means in the shape of a second regenerator 15 that is connected both to the pyrolysis chamber 5 and the reduction shaft 12. The second regenerator 15 is included in the equipment according to the present invention. The second regenerator 15 is also connected to a second air fan 16 and a third air fan 17, said air fans 16, 17 being included in the equipment according to the present invention. The second air fan 16 is blowing air into the second regenerator 15 while the third air fan 17 is sucking synthesis gas S from the second regenerator 15.

Figure 2:
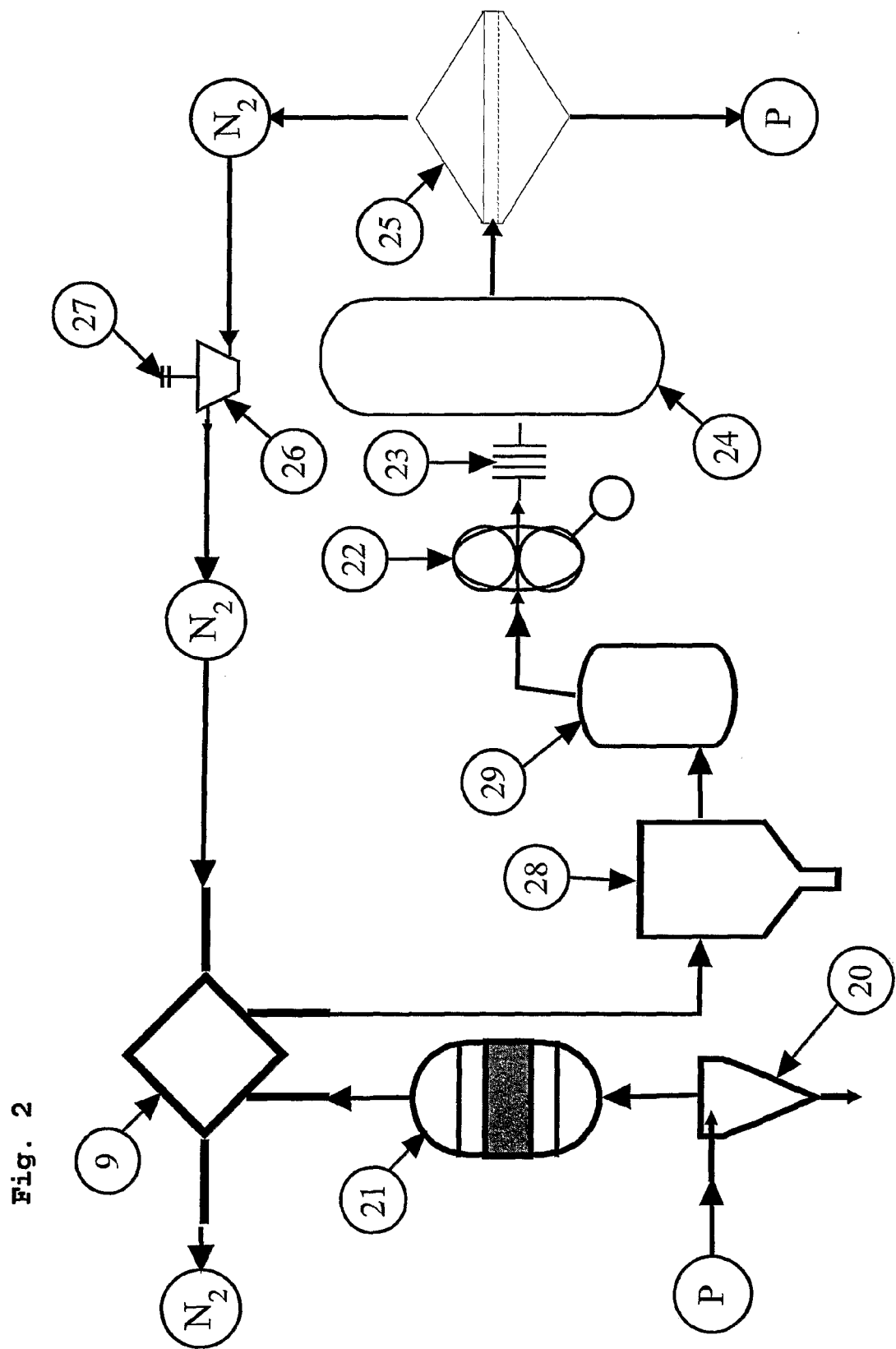
FIG. 2 shows a flow diagram of a preferred gas purifying process according to the present invention, said diagram also schematically showing units that form an equipment to carry out the purifying process.

In FIG. 2 the gas purification unit 10 is shown more in detail. The purification unit 10 comprises a cyclone 20 that is connected to a catalytic reactor 21 that also is included in the purification unit 10. The catalytic reactor 21 is connected to the first heat exchanger 9 that also is connected to a first filter 28 that preferably constitutes an electrostatic precipitator, said first filter 28 being included in the purification unit 10. The first filter 28 is connected to a scrubber 29 that is included in the purification unit 10. The scrubber 29 is connected to a compressor 22 that is included in the purification unit 10, said compressor 22 being connected to a second filter 23 that is included in the purification unit 10. The second filter 23 is preferably a mechanical filter. The second filter 23 is connected to a tank 24 that is part of the purification unit 10. The tank 24 is suitable to hold a positive pressure, said positive pressure normally being in the magnitude of about 7-11 bar. The tank 24 is connected to a membrane 25 that is part of the purification unit 10. In the membrane 25 the outgoing gas is divided into process gas P ($H_2O/CO_2$) and nitrogen gas $N_2$. The membrane 25 is connected to a turbine 26 that is energised by the nitrogen gas $N_2$. The output shaft 27 of the turbine 26 is preferably used to drive the rotary blower 11.

In FIG. 1 the process of the present invention is illustrated by means of a flow diagram. The idea of the invention is to gasify biomass to create a synthesis gas S ($H_2/CO$) with a high heat value where nitrogen is eliminated before reduction of the combustion products to synthesis gas S ($H_2/CO$). The flow process diagram of FIG. 1 illustrates a state when the process according to the present invention is running continuously. However, in practice it is necessary to start up the process from a cold state of both the biomass and the equipment for carrying out the process of the present invention. This is preferably done by utilising a gas burner. This burner will preheat and store energy in the ceramic lining of the pyrolysis chamber 5 as well as the reduction shaft 12. This preheating will be carried out until the set temperatures are met (above 1000° C.) and the process will fulfil its own energy demand. The fuel for the preheating will preferably be gaseous. Actually any fuel will do that can preheat the equipment sufficiently.

The continuous process according to the present invention will be described below, reference being made to the flow diagrams of FIGS. 1 and 2.

In the first stage the biomass is dried by outgoing heated nitrogen gas $N_2$ at an elevated pressure. Nitrogen gas $N_2$ is created in a membrane purifying step of the process that will be described below. The dried biomass goes down to the pyrolysis chamber 5 of the reactor unit 3. This is illustrated by the arrow A in FIG. 1. Nitrogen gas $N_2$ from a membrane purifying step is virtually free from water damp and has a high capacity for drying the biomass. The water damp is collected and used in a reduction step of the process that will be described below.

The second stage is effected in the reactor unit 3 where first the pyrolysis and then combustion (oxidation) is done in the ceramic insulated chambers 5 and 6. Preheated air, from the second air fan 16 and the second regenerator 15, is first heating up the fuel to drive the pyrolysis, drive the volatiles off and partly combust the fuel resulting in a coke remainder (used for the third stage) and combustible gases.

The light combustibles are first pyrolysed with hot air and incomplete combustion until only carbon (coke) is left. A second injection of preheated air, from the first air fan 8 and the first regenerator assembly 7, fulfils the combustion of the gases in a combustion chamber 6, where superheated air fully combusts all gaseous and volatiles. The air is preheated in a regenerative manner from the outgoing synthesis gases S and partly the gases from the combustion ($CO_2$, $N_2$ and $H_2O$). The combustion process is controlled by keeping the outgoing oxygen on a fixed level and temperature at 1500-1600° C. This two stage combustion leaves the main part of the carbon out of the reaction until it goes down to the third stage. Heavy components (tar) and complex components (aromates) can be destructed in the high temperature in the combustion chamber 6 and brought into the gaseous phase as elementary $CO_2$ and $H_2O$.

The outgoing gases ($CO_2$, $N_2$ and $H_2O$) from the combustion chamber 6 preferably have a temperature above 1600° C. Said outgoing gases passes through the first regenerator assembly 7 where a heat exchange takes place, i.e. the outgoing gases are cooled, preferably to 250-300° C., while process gas P from the gas purification unit 10 is heated, preferably to about 1500° C. The treatment of the process gas P will be described more in detail below.

The cooled outgoing gases ($CO_2$, $N_2$ and $H_2O$) now passes a first heat exchanger 9 where a further cooling takes place, preferably to about 40° C., and from the first heat exchanger 9 the outgoing gases ($CO_2$, $N_2$ and $H_2O$) flows to the gas purification unit 10. It is necessary to cool down the outgoing gases ($CO_2$, $N_2$ and $H_2O$) before they enter the gas purification unit 10.

In the gas purification unit 10 the outgoing gases ($CO_2$, $N_2$ and $H_2O$) are divided into a process gas P and nitrogen gas $N_2$. With reference to FIG. 2 the purification step will now be described more in detail below.

Before the outgoing gases ($CO_2$, $N_2$ and $H_2O$) from the first regenerator assembly 7 enter the gas purification unit 10 they flow through the cyclone 20 to separate the coarse material from the outgoing gases ($CO_2$, $N_2$ and $H_2O$). Then the outgoing gases ($CO_2$, $N_2$ and $H_2O$) pass through the catalytic reactor 21, through the first heat exchanger 9, through the first filter/the electrostatic precipitator 28 and through the scrubber 29. The catalytic reactor will catch all $NO_x$ from the combustion. It is needed to keep the temperature around 250° C. and to add ammonia ($NH_4$) to drive the catalytic reaction. In completing the $NO_x$ reduction only pure nitrogen and water vapour will be left. The electrostatic precipitator 28 will catch all particles from the combustion. The scrubber 29 will wash out the sulphur compounds such as $SO_2$ and $H_2S$ from the process gas. This is normally done by a caustic liquid in a counter current flow.

Then the outgoing gases ($CO_2$, $N_2$ and $H_2O$) reach the compressor 22 that pressurizes the outgoing gases ($CO_2$, $N_2$ and $H_2O$) and they pass through the second, mechanical filter 23 before they enter the tank 24, in which a suitable positive pressure is present. The compressed outgoing gases ($CO_2$, $N_2$ and $H_2O$) flow from the tank 24 through the membrane 25 where the outgoing gases ($CO_2$, $N_2$ and $H_2O$) are divided into a purified process gas P and dry nitrogen gas $N_2$ at high pressure. The nitrogen gas $N_2$ may be used to drive the turbine 26 that in its turn drives the rotary blower 11. The nitrogen gas $N_2$ constitutes about 70% of the outgoing gases ($CO_2$, $N_2$ and $H_2O$) whiles the process gas P constitutes about 30% of the outgoing gases ($CO_2$, $N_2$ and $H_2O$).

The nitrogen gas $N_2$ that leaves the purification unit 10 has a temperature of preferably about 40° C. The nitrogen gas $N_2$ is fed to the first heat exchanger 9 where the nitrogen gas $N_2$ is heated, preferably to about 200° C. This heated nitrogen gas $N_2$ is used to dry the biomass in the supply storage unit 1. After having effected drying the nitrogen gas $N_2$ that leaves the supply storage unit 1 is humid due to absorption of water.

The process gas P that leaves the purification unit 10 is fed to a rotary blower 11 and then by the rotary blower 11 forced to pass through the first regenerator assembly 7 where the temperature of the process gas P is extensively increased, preferably up to a level of about 1500° C. The heated process gas P will then be subjected to reduction in the reduction shaft 12. The reduction is effected in several stages where each reduction stage is carried out in a reduction compartment 13A-13C.

Thus, the heated process gas P is reduced in a first reduction stage in the first reduction compartment 13A, said compartment being the lowest compartment in the reduction shaft 12. In the first reduction compartment 13A the process gas P reacts with the coked fuel from the pyrolysis chamber 5, said coked fuel travelling down the reduction shaft 12. In this connection it should be pointed out that since the coked fuel has passed through all the above reduction compartments the coked fuel has been depleted during its travel through the reduction compartments 13C-13A of the reduction shaft 12. However, since the contents of the gases $CO_2$ and $H_2O$ are relatively high in the process gas P coming from the purification unit 10 the coked fuel in the reduction chamber 13A will manage to carry out a proper reduction of the process gas P, i.e. the result of the reduction will be a partly reduced synthesis gas S.

When the process gas P has been treated in the first reduction step, i.e. passed through the reduction chamber 13A, the partly reduced synthesis gas S again will be fed to the first regenerator assembly 7. When the partly reduced synthesis gas S again passes through the first regenerator assembly 7 the temperature of the partly reduced synthesis gas S is increased to a level of about 1500° C. The heated partly reduced synthesis gas S will again be subjected to reduction, this being effected by having the partly reduced synthesis gas S to pass through the second reduction chamber 13B where a similar reduction takes place as described in connection with the first reduction chamber 13A. Since the coked fuel is less depleted in the second reduction compartment 13B, compared to the first reduction compartment 13A, a proper reduction will be carried out in the second reduction compartment 13B even if the contents of the gases $CO_2$ and $H_2O$ in the partly reduced synthesis gas S are lower than during the first reduction step. The partly reduced synthesis gas S that leaves the second reduction chamber 13B will return to the first regenerator assembly 7. The partly reduced synthesis gas S will again be subjected to a temperature rise when the partly reduced synthesis gas S passes through the first regenerator assembly 7, preferably to about 1500° C.

The reduction procedure now continues by a further reduction step. The equipment shown in FIG. 1 has one more reduction chamber 13C. This means that a further reduction step is performed in a similar way as described above.

Due to the superheating of the partly reduced synthesis gas S between each reduction step the driving force for the reaction is sufficient and almost all $CO_2$ and $H_2O$ will be reduced to CO and $H_2$.

When the partly reduced synthesis gas S has been subjected to the last reduction step the partly reduced synthesis gas S has been developed to a fully reduced synthesis gas S that is sucked by the second fan 17 to the second regenerator 15 where the synthesis gas S is cooled. The synthesis gas S constitutes a mixture of CO and $H_2$. This gas can be further refined into liquid bio fuel, e.g. by Fischer Tropsch process or likewise.

Dilution between the stages is necessary to keep as low as possible to keep the process effective. If Nitrogen is carried over from drying to combustion there will be more Nitrogen to purify in the gas separation unit. If combustion gases are carried over to the reduction stage without being purified first there will be a dilution of Nitrogen and a lowering of the outgoing product heat value by this. This calls for a control of gases and pressures to reach the full capability of the process and the pressure control is the key to this.

The pressure in the system is used to minimise the dilution between the three stages of drying, combustion and reduction. This is also necessary when the mass transfer of solids is open between the three stages. For this reason pressure in the combustion chambers (stage two) is the lowest followed by the reduction chamber to minimise the carry over of gases between these two stages. The drying will have a pressure higher than both the other stages to keep hot gases from going out the wrong way.

Figure 3:
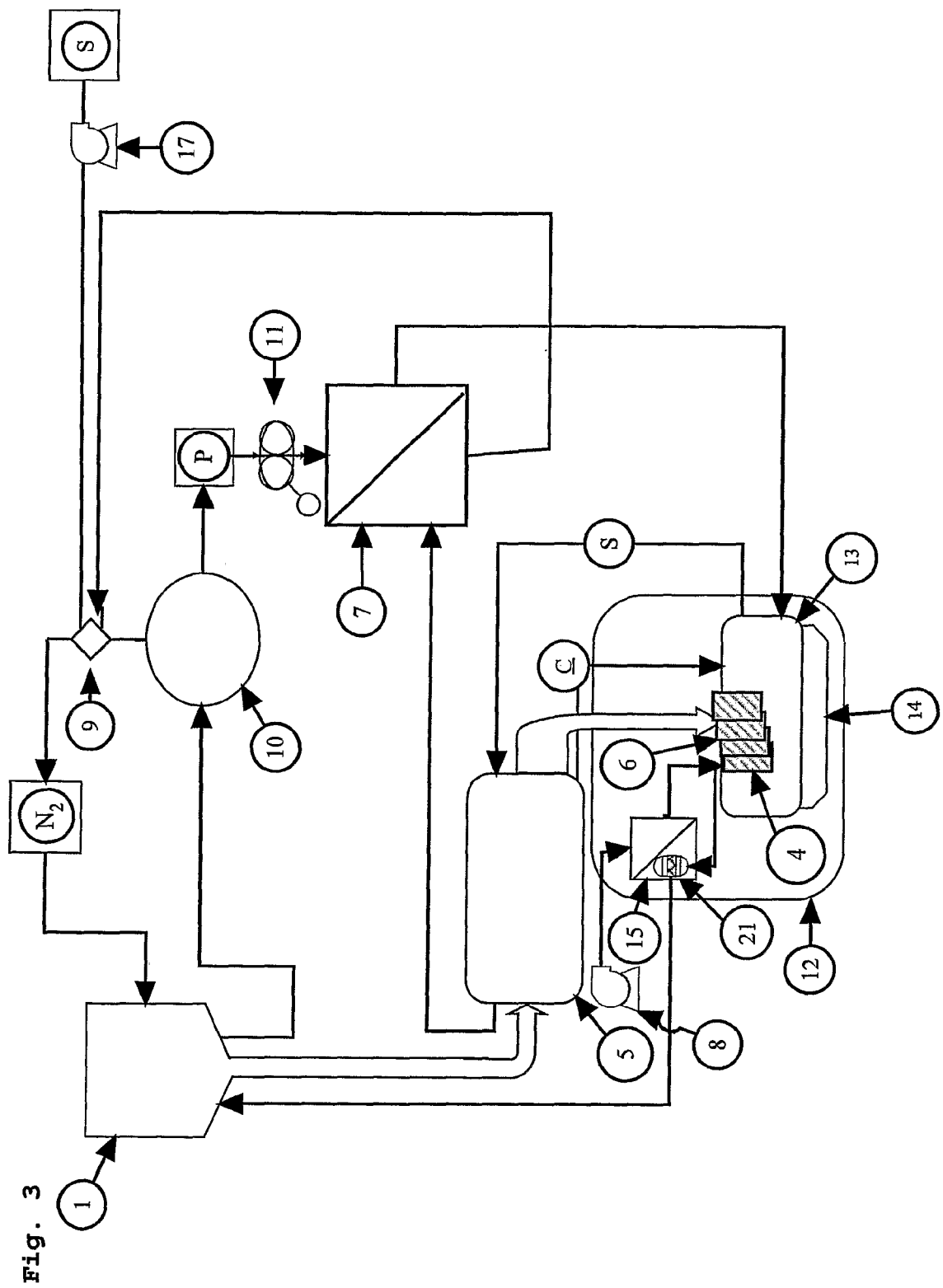
FIG. 3 shows a flow diagram of an alternative embodiment of the present invention where radiating burners with internal heat exchanging and possibly catalytic reactors is used to indirectly heat the reduction step.

In FIG. 3 an alternative process is set up based upon regenerative burners with internal heat exchanging and super heating of incoming combustion air and indirectly heating of the reduction step. Corresponding reference numerals in FIGS. 1 and 3 designate corresponding components.

The equipment comprises a supply storage unit 1 for the biomass. Biomass is usually either wood or crops that are specially grown and harvested for this purpose or by-products from pulp and paper or other industries. The supply storage unit 1 is designed to allow a stream of heated nitrogen to pass through the storage unit to dry the biomass. Biomass has some drawbacks as fuel because it is harvested with quite a high level of water (humidity) which lowers its heating value and calls for drying before using it. Many of the by-products are pelletized to be easier to handle (before and after drying). There is also a possibility to coke the wood and have a more pure source of energy.

The equipment also comprises a pyrolysis chamber 5 and a combustion chamber 6, both said chambers normally being equipped with a ceramic lining. In the combustion chamber 6 a number of regenerative burners 4 are provided, said regenerative burners 4 having internal heat exchanging means. The equipment also comprises a first regenerator assembly 7 that is connected to the combustion chamber 6. The purpose of the first regenerator assembly 7 is to effect heat exchange at high temperatures. Normally a regenerator comprises ceramic material. The first regenerator assembly 7 is also connected to a first heat exchanger 9 that is included in the equipment of the present invention. The first regenerator assembly 7 and the first heat exchanger 9 together form a first heat exchanging means. The first regenerator assembly 7 is also connected to the combustion chamber 6 to allow process gas P to be supplied to the combustion chamber 6. The first heat exchanger 9 is connected to a gas purification unit 10 that also forms a part of the equipment according to the present invention. The gas purification unit 10 corresponds to the gas purification unit of FIG. 1 and is described more in detail in FIG. 2.

A first air fan 8 is connected to the regenerative burners 4, via a second regenerator 15, said first air fan 8 forming a part of the equipment according to the present invention. The second regenerator 15 is also connected to the supply storage unit 1, a catalytic reactor 21 being integrated in the second regenerator 15.

Between the gas purification unit 10 and the first regenerator assembly 7 a rotary blower 11 is provided, said rotary blower 11 being a part of the equipment according to the present invention. Thus, the gas purification unit 10 is connected to the rotary blower 11 and the rotary blower 11 in its turn is connected to the first regenerator assembly 7.

The equipment according to the present invention also comprises a reduction shaft 12 that is connected to the pyrolysis chamber 5. The reduction shaft 12 comprises a compartment 13, carrying out the reduction step by the heat provided from the regenerative burners 4. A ceramic valve (not shown) will control the transport of char from the pyrolysis chamber 5 to the reduction shaft 12, this being indicated by the arrow C. At the bottom of the reduction shaft 12 there is a slag pocket 14, in which the remaining ash and slag is collected.

The off gas from the regenerative burners 4 is used to further heat the dryer 1.

When comparing the process carried out by the equipment according to FIG. 1 and the equipment according to FIG. 3 the main difference is how the reduction step is carried out. The equipment according to FIG. 1 carries out the reduction step in several stages while the equipment according to FIG. 3 carries out the reduction step in one stage. The regenerative burners 4 that are included in the equipment according to FIG. 3 makes it possible to carry out the reduction step in one stage. The pyrolysis gas that comes from the pyrolysis chamber 5 is subjected to a combustion in the regenerative burners 4 of the combustion chamber 6. A first air fan 8 supplies combustion air to the regenerative burners 4, said combustion air being super heated by the regenerative burners 4. The off gases from the combustion passes through the second regenerator 15 where the off gases are cooled and incoming combustion air is preheated. Since the regenerative burners 4 are located in the reduction compartment 13 indirect heating from the regenerative burners 4 is included in the reduction step of the process gas P, said reduction step being carried out in the reduction compartment 13. The result of the reduction step is a synthesis gas S that is discharged from the reduction compartment 13. The synthesis gas S heats up the pyrolysis chamber 5 on its way to the first regenerator 7. The synthesis gas S is then fed to the first regenerator 7 and the first heat exchanger 9 to emit heat.

In order to emphasise the efficiency of the process according to the present invention compared to a classic producer gas generator reference is made to the table below: Table 1, Data for a classic producer gas generator compared to the present invention.

|  | Classic (Producer gas) | Present Invention (Synthesis gas) |
|---|---|---|
| $H_2$ | 4% | 48% |
| CO | 28% | 44% |
| $CO_2$ | 8% | <1% |
| $N_2$ | 60% | <7% |
| Heating Value (MJ/m3) | 3.92 | 10.65 |

Feasible Modifications of the Invention

By adding oxygen and enriching the post-combustion step a further refinement of the process would be possible. It would be necessary to balance the heat load of the outgoing gas to the needed heat in the reduction step. A higher concentration of CO2 would be the result into the gas purification and thereby a somewhat simpler and more energy efficient purification, before the reduction.

In the embodiment of the equipment that is shown in FIG. 1 three reduction chambers are present. However, within the scope of the present invention the number of reduction chambers may be more or less than three. Normally the number of reduction chambers should not be less than two and not more than five.

In the process and equipment described above a membrane technique is used to purify the outgoing gases. However, within the scope of the present invention other techniques of gas separation are feasible.

The classic route for $CO_2$ extraction is solution in monoethanol amine (MEA). In the MEA process the $CO_2$ is captured in the liquid and is separated by heat stripping. This heat cycle also regenerates the MEA. In this manner no Nitrogen would be present in the outgoing released gases.

Pressure Swing Adsorption (PSA) is an alternative route where pressurised gases saturate zeolithes and activated carbon to separate Nitrogen from gas streams. Gas purification by both these routes demands that water is separated before purification and in this process it will be necessary to carry this water back to the process to the reduction stage.

As an alternative to the first filter/the electrostatic precipitator 28 of the purifying unit 10 the collected dust may be fed back to the pyrolysis chamber 5.

In the description above the process of the present invention is stated as a process mainly run under ambient pressure. When building a larger unit it can and will be possible to increase the pressure and thereby have a higher density for the whole process. In practice this means less steel and refractory per production unit i.e. less investment per produced unit of synthesis gas.

The main changes of the equipment will be that the fans and blowers will need to be compressors and turbines. The reactor unit 3 will constitute a pressure vessel. All piping will have to be fitted to the actual pressure. The regenerators will have to be pressure-proof to a higher degree and the gas cleaning equipment will be modified.

As regards the alternative embodiment disclosed in FIG. 3 the regenerative burners 4 and the regenerator 15 are separate components of the equipment. However, within the scope of the present invention it is feasible that the regenerator 15 constitutes an integrated part of the regenerative burners 4. The regenerator 15 is then a multiple set of internal heat exchangers in the regenerative burners 4.

Since the regenerator 15 is an integral part of the regenerative burners 4 also the catalyctic reactor 21 will constitute an integral part of the regenerative burners 4.

The invention claimed is:

1. A process for producing synthesis gas (S) from biomass, said process comprising a drying step, a pyrolysis step and a combustion step, and further comprising:
    subjecting outgoing gases comprising $CO_2$, $N_2$ and $H_2O$ from the combustion step to heat exchange, where the outgoing gases are cooled,
    purifying the cooled outgoing gases to achieve a process gas (P), by separating and removing nitrogen ($N_2$) from the outgoing gases,
    subjecting the process gas (P) to heat exchange, where the process gas (P) is heated,
    reducing the process gas (P) to synthesis gas (S), and
    subjecting the synthesis gas (S) to heat exchange, where the synthesis gas (S) is cooled.

2. The process according to claim 1, wherein the cooling of the outgoing gases and the heating of the process gas (P) are effected in a common heat exchange step.

3. The process according to claim 1, wherein the cooling of the outgoing gases by heat exchange is effected in two separate steps.

4. The process according to claim 1, wherein the separated nitrogen gas ($N_2$) is used to dry the biomass.

5. The process according to claim 1, wherein reducing the process gas (P) to synthesis gas (S) is effected in a series of at least two reduction steps.

6. The process according to claim 5, wherein, in a first of the at least two reduction steps, a reaction with coked fuel from the pyrolysis and combustion steps is initiated, and said coked fuel has participated in previous reduction steps.

7. The process according to claim 1, wherein reducing the process gas (P) to synthesis gas (S) is effected in a single step.

8. The process according to claim 1, wherein the synthesis gas (S) comprises $H_2$ and CO.

9. A process for producing synthesis gas (S) from biomass, comprising:
    drying the biomass;
    pyrolyzing and combusting the dried biomass to produce a coked fuel and combustion gases of $CO_2$, $N_2$ and $H_2O$;
    subjecting the combustion gases to a heat exchange to cool the combustion gases;
    separating the $N_2$ gas from the cooled combustion gases to produce $N_2$ gas and a process gas (P) comprising of $CO_2$ and $H_2O$;
    subjecting the process gas (P) to a heat exchange to heat the process gas;
    subjecting the heated process gas (P) to one or more reduction step to produce the synthesis gas (S) comprising $H_2$ and CO.

10. The process according to claim 9, wherein the one or more reduction step comprises reacting the process gas (P) with the coked fuel, to reduce the process gas (P) comprising $CO_2$ and $H_2O$ to the synthesis gas (S) comprising $H_2$ and CO.

11. The process according to claim 9, further comprising cooling the synthesis gas (S).

12. The process according to claim 9, wherein the heat exchange used to cool the combustion gases is also a same heat exchange used to heat the process gases.

13. The process according to claim 9, wherein the biomass is dried with the separated $N_2$ gas that is produced when separating the $N_2$ gas from the cooled combustion gases.

14. The process according to claim 9, wherein the one or more reduction step is a single reduction step.

15. The process according to claim 9, wherein the synthesis gas (S) comprises less than 1% $CO_2$ and less than 7% $N_2$.

16. The process according to claim 9, wherein the synthesis gas (S) comprises 48% $H_2$ and 44% CO.

17. The process according to claim 1, wherein the synthesis gas (S) comprises less than 1% $CO_2$ and less than 7% $N_2$.

18. The process according to claim 1, wherein the synthesis gas (S) comprises 48% $H_2$ and 44% CO.

* * * * *